Sept. 21, 1971  E. W. WITTKOPF  3,606,644
MACHINE FOR FORMING CELLULOSIC PRODUCT
Filed June 11, 1969  5 Sheets-Sheet 1
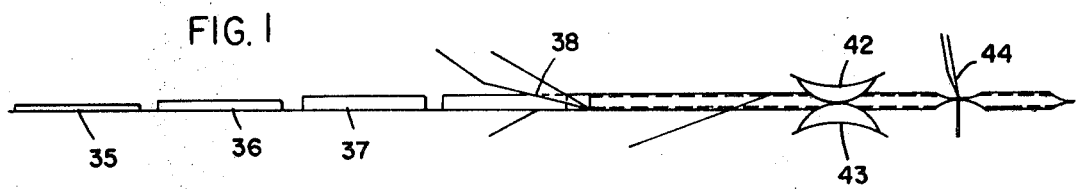
FIG. 1
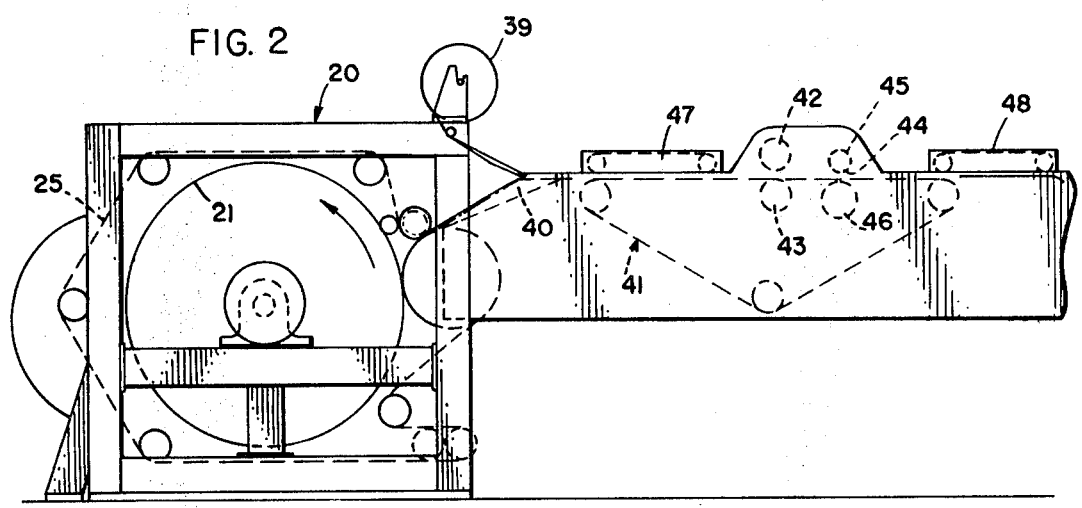
FIG. 2
FIG. 3
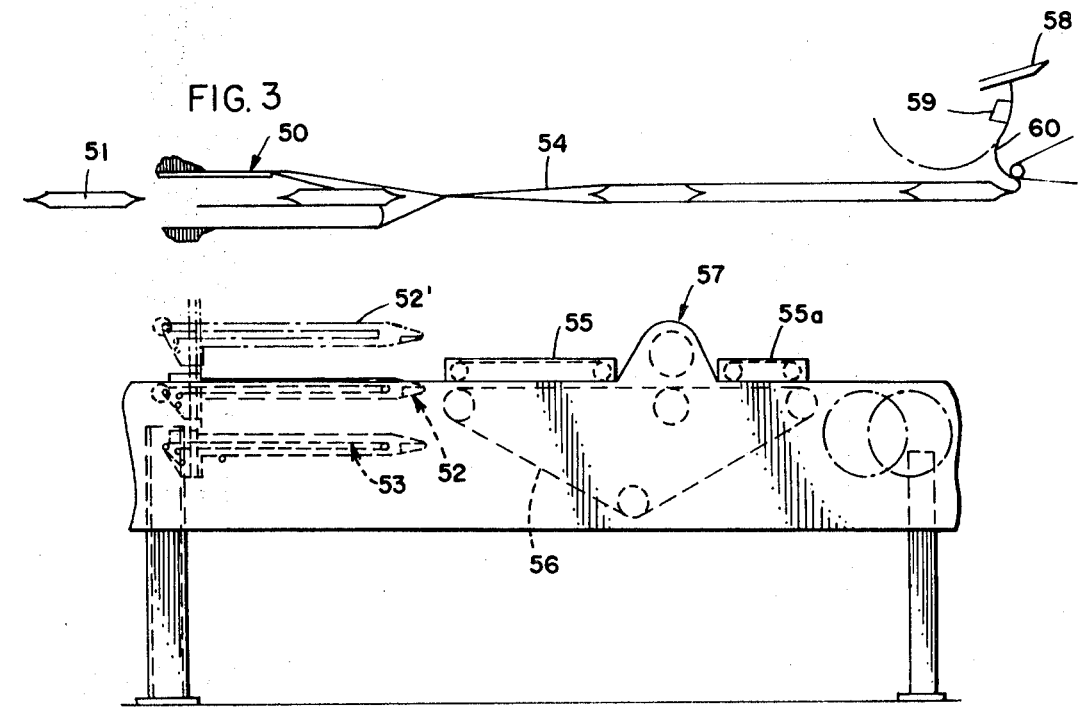
FIG. 4
INVENTOR:
EUGENE W. WITTKOPF
BY
Dawson, Tilton, Fallon & Lungmus
ATT'YS INVENTOR:
EUGENE W. WITTKOPF
BY
Dawson, Tilton, Falloy & Lungmus
ATT'YS

INVENTOR:
EUGENE W. WITTKOPF

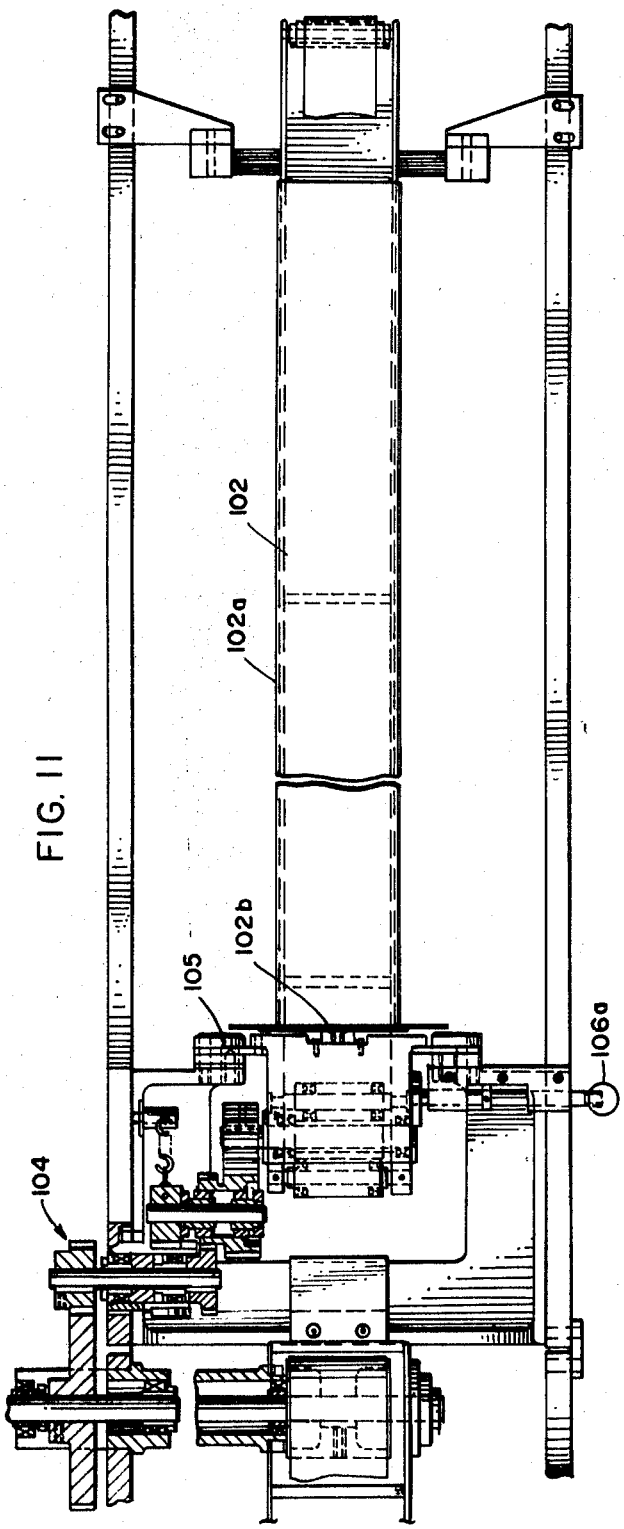
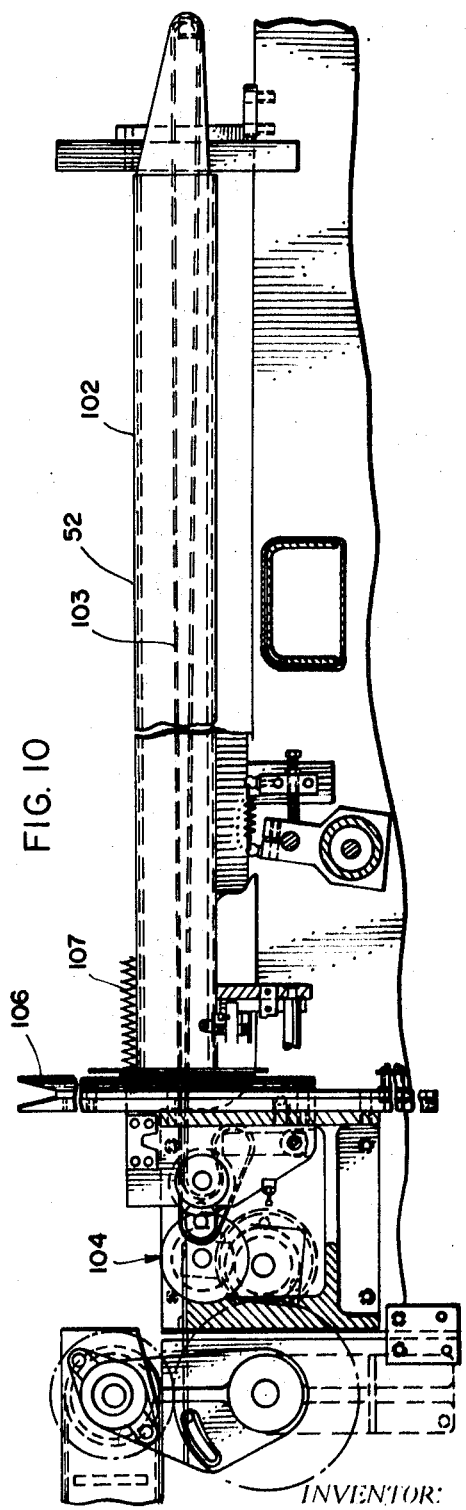

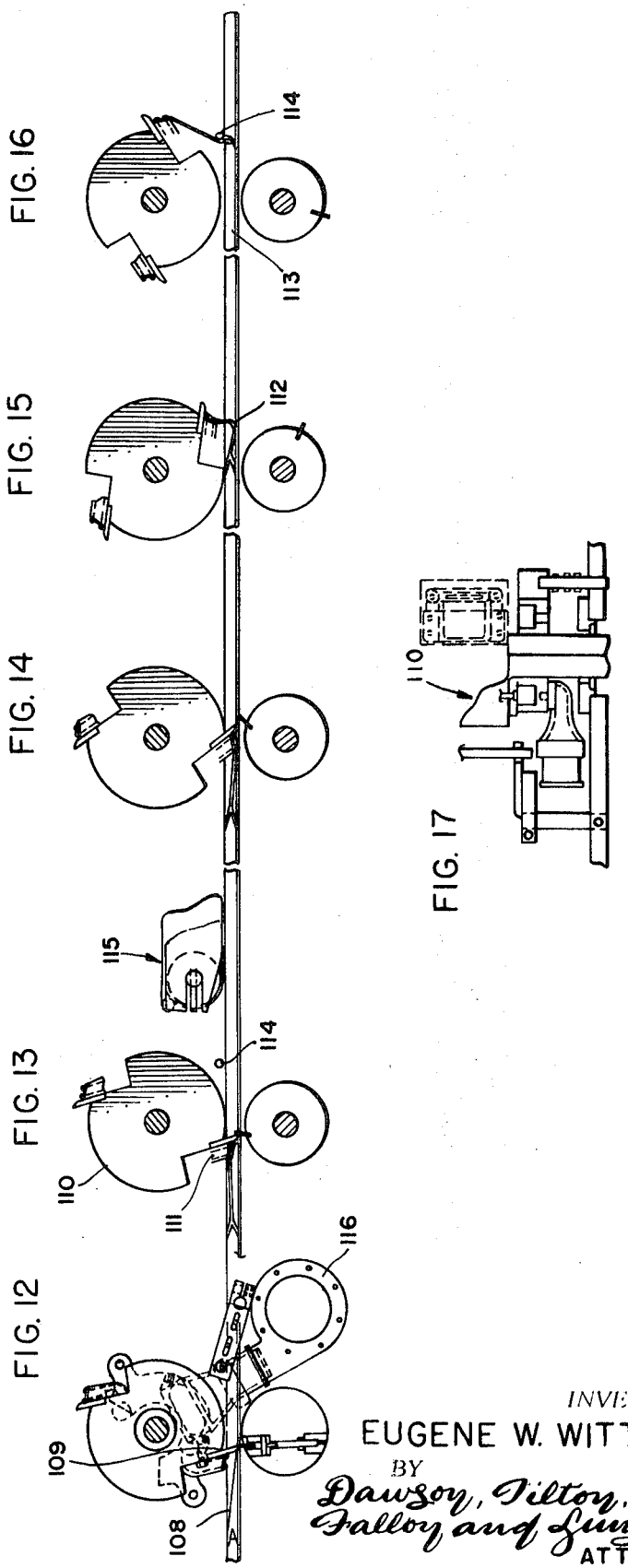

United States Patent Office 3,606,644
Patented Sept. 21, 1971

3,606,644
MACHINE FOR FORMING CELLULOSIC PRODUCT
Eugene W. Wittkopf, Little Suamico, Wis., assignor to Paper Converting Machine Company, Inc., Green Bay, Wis.
Filed June 11, 1969, Ser. No. 832,299
Int. Cl. A61l 15/00
U.S. Cl. 19—14S                            7 Claims

ABSTRACT OF THE DISCLOSURE

A machine for continuously forming cellulosic products such as sanitary napkins, in which fluff is deposited on a carrier web from a rotating drum, sealing means provided at the point of web transfer from the drum, means for advancing the web-supported fluff napkins toward horns employed for ensleeving the napkins with a gauze tube, and cut-off means for separating individual napkins with the leading portions of the wrapping overfolded.

BACKGROUND AND SUMMARY OF INVENTION

In the production of cellulosic products such as sanitary napkins, a problem has existed in providing a highspeed, reliable machine which starts with the raw materials, i.e., pulp used to provide the absorbent pad and web providing the support and enclosure for the pulpy fluff. In particular, a problem has existed with controlling the amount of fluff laid down and thereafter confining it suitably against dissipation by spurious air currents. Further problems have existed in the reliable handling of the pad once it has been established, and for conducting it through various manipulations incident to packaging. These have been solved by the machine of the instant invention and by the provision of specific structural features at different stages in the machine, the provision of which constitute important objectives of the invention.

DETAILED DESCRIPTION

The invention is described in conjunction with an illustrative embodiment in the accompanying drawings, in which:

FIG. 1 is a schematic side elevational view of the progress of the product through the first portion of the machine;

FIG. 2 is a generalized side elevational view of the first portion of the machine, and corresponds generally to the portion productive of the product seen in the process of being formed in FIG. 1;

FIG. 3 is a view similar to FIG. 1 and illustrates the remainder of travel of the product as it goes through the second portion of the machine;

FIG. 4 is a continuation of the showing in FIG. 2, featuring the portion of the machine responsible for the activity depicted in FIG. 3;

FIG. 10 is a fragmentary side elevational view of the portion of the machine employed for ensleeving the partially formed napkins with a gauze tube, and corresponds to the extreme left-hand portion of FIG. 4;

FIG. 11 is a top plan view of the apparatus portion seen in FIG. 10;

FIGS. 12–16 are fragmentary side elevational views of a rotary cutoff and leading edge-fold back mechanism portion of the machine, but in different stages of operation; and FIG. 17 is a fragmentary plan view of the apparatus seen in each of the views FIGS. 12–16.

Figure 5:
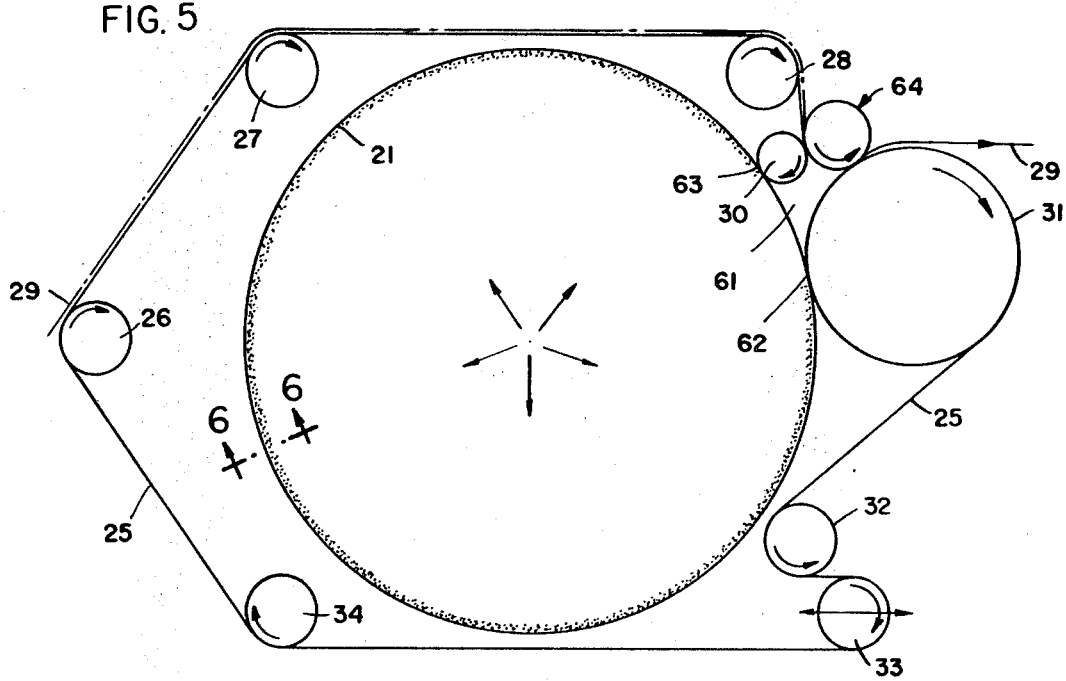
FIG. 5 is an enlarged side elevational view of the fluff depositing drum seen at the extreme left-hand portion of FIG. 2.

In the illustration given, and with particular reference to FIG. 2, the numeral 20 designates generally a frame which supports a forming drum 21, this also being seen in FIG. 5. The forming drum is described only generally herein, being the subject of a copending, co-owned application of Nystrand and Broeren, Ser. No. 842,146, filed July 16, 1969 reference to which may be had for additional details of construction.

Figure 6:
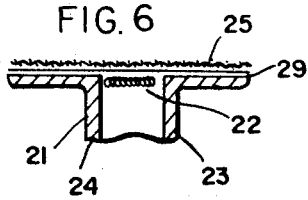
FIG. 6 is a transverse sectional view (fragmentary) on an enlarged scale of the peripheral portion of the fluffforming drum as seen along line 6—6 of FIG. 1.

The forming drum 21 is set up so that shredded pulp enters the drum axially and, by virtue of the air pressure causing the flow of the shredded pulp, the fluff is forced radially outward to the position designated 22 in FIG. 6. Still referring to FIG. 6, it is seen that the drum 21 includes side walls 23 and 24 which are flanged at their periphery so as to support a woven wire support 25. The woven wire support 25 is so designated also in FIGS. 2 and 5, and is seen to travel in a closed loop. Referring to FIG. 5, it is seen that the wire support 25 travels over idlers 26, 27, and 28 in proceeding from left to right in its "return" path. During this path, a carrier web 29 is carried on the support 25 and travels with the wire support 25 around the entrance roll 30. Thereafter, the wire and web 25 and 29 travel with the drum 21, providing an air permeable barrier for deposition of fluff. The fluff is deposited almost entirely around the periphery of the rotating drum 21 until the carrier 29 and support 25 travel with the leaving roll 31. Thereafter the fluff supporting carrier web 29 is arranged for generally horizontal travel, while the wire support 25 commences the lower run of its return. In FIG. 5 this is seen to include proceeding around an idler roll 32, a take-up roll 33, and a further idler 34 disposed suitably along the return path of travel.

The periphery of the drum 21 is equipped with cross bars (not shown) which are positionable so as to define discrete circumferential lengths corresponding to the length of the sanitary napkin to be produced thereon. For example, in FIG. 1, it is seen at 35 (extreme left) that a pad is in the process of being laid down. As the drum rotates with the wire support and carrier web 25 and 29, respectively, thereon, the pad builds up to the proportions seen at 36 and at 37. At the station indicated by the numeral 38 in FIG. 1, a barrier sheet is applied as from a roll of plastic material at 39 (see FIG. 2). Forming plates, as at 40, are interposed in the path of travel of the carrier web 29 to facilitate the partial enveloping of the carrier web 29 and fluff pad with the barrier web or sheet at the station 38. A bottom supporting conveyor chain 41 having longitudinally spaced apart cross bars transports the pad along the machine and ultimately to contouring rolls 42 and 43.

The contouring rolls 42 and 43 develop a pinched end portion on the pads and associated barrier and carrier webs, which is then subjected to a rotary cut-off as at 44. For this purpose a blade 44 is mounted on the cut-off roll 45 (see FIG. 2) operating against an anvil roll 46, both of which are suitably journaled within the frame 20, much the same as the other rolls hereinbefore referred to.

Still referring to FIG. 2, the numerals 47 and 48 refer to first and second pull belt arrangements in the path of travel of the pads. The first pull belt arangement 47 is seen to be installed on the frame in advance of the contouring rolls 42 and 43. The first pull belt arrangement 47 provides a nip for the advancement of the combined carrier and barrier sheets so as to continually draw the same from the portion of the apparatus depicted to the left thereof. The whole belt conveyor designated 48 at the extreme right hand portion of FIG. 2 is employed as a speed-up conveyor so as to separate the various parts by a greater distance than that made possible by the spacing developed in the forming drum 21.

Referring now to FIG. 3, the numeral 50 designates generally an ensleeving mechanism which is employed to place a stocking around each pad. The pad 51, seen to the extreme left of FIG. 3, consists of a fluff pad itself, the portion of the carrier web 29, and the barrier sheet (formed into an envelope) applied at the station 38. The ensleeving mechanism 50 includes a pair of horns, generally designated 52 and 53, which are selectively movable into pad receiving position. When one horn is in the position designated 53, it is loaded with a tubular knitted overwrap, and then shifted to the position designated 52 for the receipt of the pad 51. Each horn is capable of receiving sufficient knitted overwrap material to accommodate 50 to 100 pads, the knitted overwrap being designated by the numeral 54 in FIG. 3. The knitted overwrap is advanced by further pull belts 55 in combination with cross bar chains 56 to advance the pads confined in the knitted overwrap past a cut-off station generally designated 57. At this point, the pads are once again individualized, and subsequently are conveyed further to the right by means of further pull belts 55a. The rotary cut-off knife 58 is equipped with a vacuum device 59 (see FIG. 3) which is effective to fold back the leading portion 60 of the knitted overwrap. The trailing edge portion of the overwrap is folded in conventional fashion, as by moving the individualized pads through a circular turn-around (not shown), after which the pads are stacked for packaging.

Figure 7:
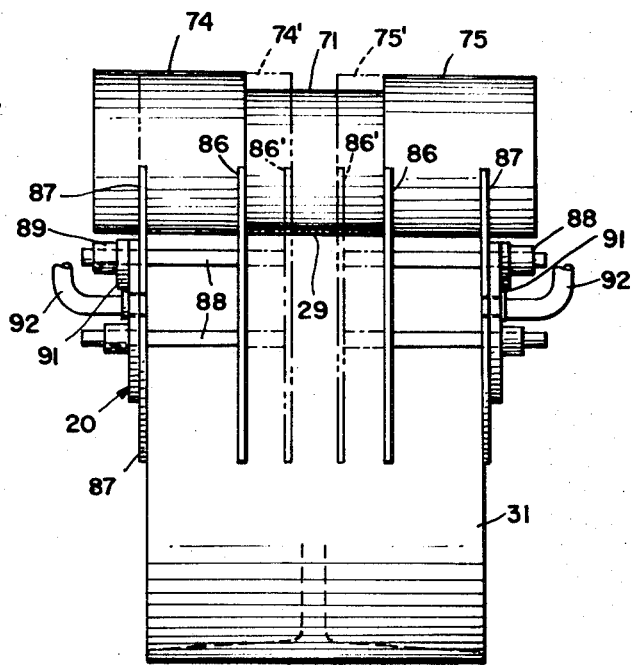
FIG. 7 is a fragmentary elevational view of the portion of the machine encountered as the partially formed napkins leave the forming drum, and corresponds essentially to that seen along the sight line 7—7 applied to FIG. 8.
Figure 9:
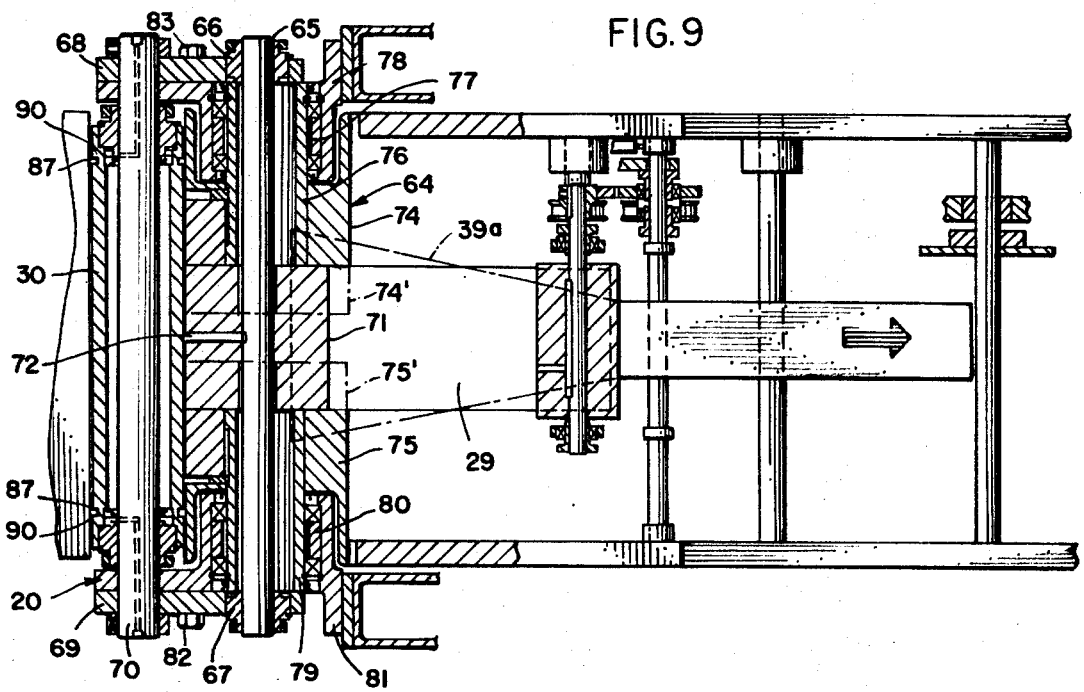
FIG. 9 is a fragmentary sectional view such as would be seen along the sight line 9—9 applied to FIG. 8.
Figure 8:
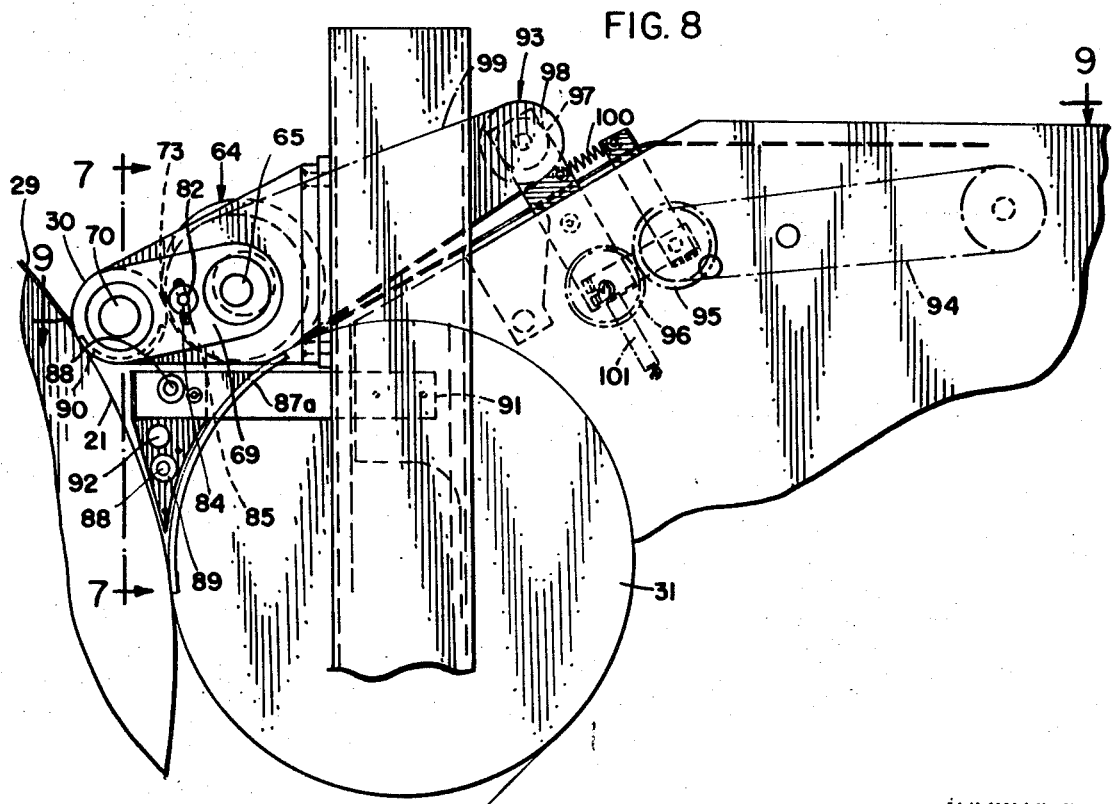
FIG. 8 is a fragmenatry enlarged side elevational view of the right hand portion of FIG. 5.

The problem of fluff dissipation has been solved through the use of the unique roll arrangement depicted in FIGS. 7–9. As mentioned previously, the carrier web 29 is partially wrapped around the entrance roll 30 before the carrier web 29 engages the periphery of the forming drum 21. The carrier web 29 and the wire support 25 are compressed between the roll 30 and the drum 21, the roll and drum being in pressure engagement to prevent the escape of fluff therebetween, i.e., generally longitudinally of the length of the carrier web 29. By the same token, the carrier web 29 and the wire support 25 are also "squeezed" between the leaving roll 31 and the periphery of the drum 21, i.e., the roll 31 and the drum 21 are in pressure engagement so as to also prevent the escape of fluff therebetween. It will be appreciated that the area designated 61 (see FIG. 5) constitutes a pocket where fluff may enter unimpeded by the presence of either the wire support 25 or the carrier web 29, the fluff flowing radially outward from the axis of the drum 21 as is indicated schematically by arrows in FIG. 5. Thus, the cooperation between roll 31 and drum 21 prevents escape of fluff through the nip designated 62 in FIG. 5, and the cooperation of the roll 30 and the drum 21 prevents escape of fluff through the nip designated 63 in FIG. 5. A roll structure, generally designated 64 (see particularly FIG. 5), is interposed between the rolls 30 and 31 to prevent escape of fluff longitudinally of the web 29. The roll structure 64 includes a third roll assembly and a fourth roll, as can be appreciated from a consideration of FIG. 9. In FIG. 9, the numeral 65 designates a transverse shaft which is suitably journalled in bearings 66 and 67, one on each side of the carrier web 29. The bearing 66 is provided as part of a pivot arm 68, while the bearing 67 is provided as part of the pivot arm 69. The pivot arm 69, as can be seen in FIG. 8, is arranged to pivot about the axis of the shaft 70 supporting the first or entrance roll 30. The shaft 70, in turn, is suitably journaled within a portion of the frame 20 (so indicated in the lower left-hand portion of FIG. 9). Fastened to the transverse shaft 65 is a fourth roll 71, the securement being achieved through a set screw 72. The roll 71 defines a nip 73, with the first roll 30 being in pressure engagement therewith (and thereby squeezing a wire support 25 and carrier web 29) so as to prevent escape of fluff between these two rolls. It will be seen, however, from a consideration of FIG. 9, that the width (in a transverse direction) of the roll 71 is not as great as that of the roll 30. The roll 71 is intended to encompass only the width of the pad 22 and, outboard of this, a third roll structure is provided.

The third roll structure is seen to include two separated segments, one as at 74 in the upper left hand portion of FIG. 9, and the other as at 75 in the lower left hand portion of FIG. 9. The roll 74 is mounted on a hollow shaft 76 which is suitably journaled in a bearing 77. In turn, the bearing 77 is rigidly supported by a frame portion 78. In like fashion, the roll 75 is secured to its hollow shaft 79. This is journaled in the bearing 80 carried by the frame portion 81 of the main frame 20. The hollow shafts 76 and 79 house the through shaft 65 so that the roll 71 can be positioned independently of the two-section third roll assembly made up of the roll sections 74 and 75. The roll sections 74 and 75 are in pressure relationship with the rolls 30 and 31. On the other hand, the fourth roll 71 is only in pressure relationship with the roll 30, but with support 25 and web 29 therebetween. A discrete distance is provided between the periphery of the roll 71 and that of the roll 31, to permit the fluff-equipped carrier web 29 to pass therebetween. The precise position of the axis of the roll 71 is dictated by the position of the pivot arms 68 and 69, and the position of these arms is fixed by tightening the nuts 82 and 83 (see the lower and upper left hand portions of FIG. 9, respectively). The nuts 82 and 83 are threadably received on a bolt extension as at 84 (see the left hand side of FIG. 8) provided as part of the stationary frame 20. The bolt extensions 84 extend through slots 85 in the pivot arms 68 and 69, and thereby provide for precise positioning of the roll 71; hence the spacing between the roll 71 and the roll 31.

By removing the bearing 66 from the pivot arm 68, the shaft 65 can be moved axially (after the set screw 72 has been loosened), and the roll 71 also removed—this without the need for disassembling the sectional roll made up of portions 74 and 75.

By the foregoing I have provided a novel roll arrangement that prevents escape of fluff in a direction generally longitudinal of the machine, or parallel to the carrier web. Also, through the provision of the sectional third roll of the assembly, consisting of the sections 74 and 75, along with the fourth roll 71, I make it possible to operate the machine with different pad thicknesses, i.e., by making it relatively easy to vary the spacing between the rolls 71 and 31. Also, by making simple the removal of the roll 71, I can readily accommodate different width pads. For example, in FIG. 9, the dotted line designated by the numerals 74' and 75' refer to positions of the third roll sections 74 and 75 when a much narrower roll is substituted for the shown fourth roll 71. Once the fourth roll 71 is removed—as by first axially moving the shaft 65—I am able to slide the sections 74 and 75 toward each other along the hollow shafts 76 and 79, respectively. After a narrower width roll has been substituted for the shown roll 71, the roll sections 74 and 75 are moved toward each other along the hollow shafts to the dotted line positions shown at 74' and 75'. I thus accommodate the machine for varying thickness and varying width, as desired, in different sanitary napkins or like products.

Escape of fluff in a direction transverse of the machine is provided by pairs of barrier plates which, in side elevation, are generally kite-shaped, corresponding to the area seen in FIG. 5 and bounded by the rolls 21, 30, 64, and 31. I provide a pair of barrier plates, suitably spaced apart, on each side of the carrier web 29. These can be best seen in FIG. 7 where the inboard barrier plates are designated by the numeral 86, and the outboard barrier plates by the numeral 87. The inboard barrier plates 86 are adjustable transversely of the machine (when the width of the roll 71 is reduced) to the position designated 86′ in FIG. 7. For this purpose, each inboard barrier plate 86 is mounted on transverse shafts 88 which extend through the outboard barrier plate 87, and are releasably locked in place by bolts 88. The outboard barrier plates 87 are rigidly secured to the machine frame 20. Each outboard barrier plate 87 is received within annular grooves as at 90 in roll 30 (see FIG. 9). For the seal between the barrier plate 87 and the roll 31, the bars 91 press the barrier plates 87 into pressure engagement with the ends of the roll 31 (see FIG. 7), the overlap being designated by the numeral 87a in FIG. 8. No such grooves are provided in either the drum 71 or the third roll assembly consisting of the sections 74 and 75. The space between each pair of barrier plates is pressurized by air introduced through a pipe 92 (see FIG. 7 particularly). By adjusting the fluid pressure within the pipe 92, and hence in the spaces between the barrier plates 86 and 87, I am able to substantially eliminate escape of fluff transversely of the machine. At the same time, there is no interference with the aeration of the width of the pad, nor its height.

As the carrier web 29, with its supported fluff, passes between the adjacent contours of the rolls 71 and 31, the product is conducted further along the machine, i.e., to the right in FIG. 8, by means of a belt assembly generally designated 93. To power the belt assembly 93 I provide a power transmission 94 (see the right hand portion of FIG. 8) which operates through a two-gear train 95 and 96, and thence through a toothed belt and sprocket system 97 to the driving roll 98. A flat belt 99 couples the driving roll 98 to the fourth roll 71. Suitable springs, as at 100 and 101, are provided in the power transmission frame to make sure that the belt 99 is properly positioned and tensioned.

As indicated previously, the pads of fluff and the carrier web 29 are partially enveloped with a plastic sheet (designated 39a in FIG. 9) from the supply roll 39. After the pads have been partially enveloped in the plastic sheet 39a and transversely severed to the condition designated 51 in FIG. 3, the ensleeving horn 52 is encountered in the progress of the pad through the machine. Each horn 52 and 53 includes an elongated tubular member 102 (see FIG. 10) positioned within an outer tubular element 102a about which the stocking is ensleeved. The element 102 is releasably locked in place by a door catch 102b. Supported within the tubular enclosure 102 is a conveyor 103 which is powered from the entering end via a friction drive generally designated 104. The entering end of the enclosure 102 is equipped with laterally extending bayonet-type fittings or projections 105 which are received within the twin magazine slots 106. The gauze stocking 107, which is over the outer element 102a, is continually removed into covering relation with the pads 51 as they issue from the enclosure 102 at the leaving end. As the gauze stocking 107 is depleted from the horn 52, the lever 106a is tripped to cause horn 52 to drop to the 53 position. A next horn 52′ (see FIG. 4) is thus permitted to slide downwardly in slots 106 to continue the operation.

At the leaving end of the horn 52, a series of pads is provided within a continuous stocking, as at 108 in FIG. 12. The stocking 108 is severed by a rotary knife 109 (part of cutoff station 57) as seen in the sequence of views FIGS. 12–14. The rotary knife 109 is carried on a rotatably mounted roll 110 which additionally is equipped with a vacuum providing device 111 immediately behind (in the direction of rotation) the knife 109. As the rotary knife passes through the FIGS. 13 and 14 showings, the vacuum device exerts a suction on the leading edge of the stocking 108, causing the same to follow the upward movement of the vacuum device 111. This produces the slack 112 indicated in FIG. 13, and as the pad proceeds further along the machine, the leading edge is caused to be folded over the main body of the pad 113. A complete folded-over condition is insured by the presence of the roller 114 which, as seen in FIG. 13, is at the entering end of a conveyor belt generally designated 115. The vacuum device 111 is activated by means of a suction blower 116 (see also FIG. 17).

I claim:

1. A machine for forming a cellulosic product comprising a frame, a fluff-forming drum rotatably supported on said frame, means for introducing air axially into said drum, spaced-apart first and second rolls arranged in juxtaposition to said drum on said frame for defining a path for travel of an air-penetrable continuous carrier web in partial wrapping engagement with said drum, roll means on said frame in juxtaposition with said first and second rolls for restricting flow of air from said drum longitudinally of said carrier web, a pair of spaced-apart barriers on each side of said path and conforming to the contour of said first and second rolls and said roll means, and means for introducing air into the space between each pair of barriers to restrict flow of air from said drum transversely of said carrier web after the same has disengaged said drum whereby substantially all of said air exits radially from said drum through said air penetrable continuous carrier web.

2. The structure of claim 1 in which the one of each barrier pair closer to said carrier web is equipped with mounting means for positioning the same at various positions relative to its associated barrier to accommodate carrier webs of different widths.

3. The structure of claim 1 in which conveyor means are operably associated with said carrier web for transporting the same in a generally horizontal path after said carrier web has disengaged said drum and with fluff supported thereon, means in said path for ensleeving said fluff and carrier web with an elongated foraminous stocking, said ensleeving means including alternatively employable elongated hollow tubular members internally equipped with a longitudinally extending conveyor.

4. The structure of claim 1 in which conveyor means are operably associated with said carrier web for transporting the same in a generally horizontal path after said carrier web has been disengaged from said drum and with fluff supported thereon, means in said path for ensleeving said fluff and carrier web with an elongated foraminous stocking, rotary knife means in said path for transversely severing said stocking, said rotary knife means including a vacuum device for engaging the leading edge portion of said stocking after severance and folding said leading edge portion on the unsevered portion of said stocking.

5. A fluff former comprising a frame, a drum rotatably mounted on said frame, means operably associated with said drum for supplying an elongated carrier web for travel in partial wrapping engagement with the periphery of said drum for intercepting radially outwardly directed air-borne fluff, a first roll rotatably mounted on said frame arranged in juxtaposition to said drum and with the axis thereof parallel to the drum axis and being generally in pressure engagement therewith to prevent escape of fluff therebetween, a second roll rotatably mounted on said frame in juxtaposition to said drum and with its axis parallel to the drum axis, said first and second rolls being adjacent to each other but spaced apart to define an exit path for the carrier web from said drum, third and fourth rolls rotatably mounted on said frame also with their axes parallel to the drum axis, said third and fourth rolls being generally in pressure engagement with said first roll to prevent escape of fluff therebetween, said third roll having a section on each side of said fourth roll and being in generally pressure engagement with said second roll to prevent escape of fluff therebetween, said fourth roll being mounted a spaced distance from said second roll to provide a confined zone for exiting of the fluff-carrying carrier web, said drum and first, second, and third rolls being arranged and mounted on said frame to define generally kite-shaped, laterally facing openings along each side of said carrier web, an outer barrier plate on said frame on each side of said carrier web, said first and second rolls being equipped with annular grooves to receive said outer barrier plates, an inner barrier plate spaced inwardly of each outer barrier plate, and means for delivering pressurized air between each inner and outer barrier plate to prevent escape of fluff laterally of said carrier web.

6. The structure of claim 5 in which said frame is equipped with a pivot arm pivotally mounted thereon on each side of said carrier web, a shaft rotatably carried by said arms and carrying said fourth roll, and means associated with said pivot arms and frame for fixing the pivotal position of said arms whereby the spacing between said second and fourth rolls is adjustable.

7. The structure of claim 6 in which said frame is equipped with bearings on each side of said carrier web aligned with the axis of said third roll, a hollow shaft for each third roll section journalled in each of said bearings, the fourth roll shaft extending through said hollow shaft.

References Cited

UNITED STATES PATENTS

| | | | |
|---|---|---|---|
| 1,950,765 | 3/1934 | Winter | 19—145 |
| 2,073,329 | 3/1937 | Winter | 19—144.5 |

FOREIGN PATENTS

| | | | |
|---|---|---|---|
| 1,023,722 | 3/1966 | Great Britain | 19—144.5 |

DORSEY NEWTON, Primary Examiner